Figure 1:
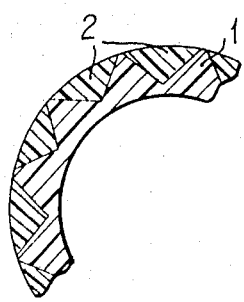

United States Patent [19]
Stent

[11] 3,825,036

[45] July 23, 1974

[54] REINFORCED PLASTICS TUBES

[75] Inventor: Vernon Denis Stent, Woking, England

[73] Assignee: Creators Limited, Surrey, England

[22] Filed: May 15, 1972

[21] Appl. No.: 253,107

[30] Foreign Application Priority Data
May 19, 1971 Great Britain................. 15894/71

[52] U.S. Cl. .............................................. 138/174
[51] Int. Cl. ............................................. F16l 11/08
[58] Field of Search .......... 138/174, 177, 172, 153, 138/140; 161/60, 166, 168, 143; 425/382, DIG. 16

[56] References Cited
UNITED STATES PATENTS
2,428,518 10/1947 Everett ......................... 138/140 X
3,574,104 4/1971 Medler ........................... 161/143 X Primary Examiner—Jerry W. Myracle
Attorney, Agent, or Firm—Larson, Taylor and Hinds

[57] ABSTRACT

The invention is concerned with reinforced flexible plastics tubes and methods of making same. A tube of this invention has an extruded wall constituted by two different plastics materials of which one is more rigid and/or has a higher mechanical strength than the other and defines a plurality of circumferentially disposed axially extending reinforcements separated by the other plastics material and fused thereto. Tubes of this invention provide improved resistance to elongation and bursting when used for conveying fluids under pressure.

11 Claims, 9 Drawing Figures

PATENTED JUL 23 1974  3,825,036

SHEET 1 OF 2

REINFORCED PLASTICS TUBES

This invention relates to reinforced flexible plastics hoses or tubes and to methods of and apparatus for making same.

From one aspect, the invention consists in a reinforced flexible plastics tube having an extruded wall constituted by first and second compatible plastics materials of which the second material is more rigid and/or has a higher mechanical strength than the first material and defines a plurality of circumferentially disposed, axially extending, reinforcements having the first plastics material therebetween and fused thereto.

From another aspect, the invention consists in a method of making a reinforced flexible plastics tube, comprising extruding first and second compatible plastics materials, of which the second material, in the solidified state, is more rigid and/or has a higher mechanical strength than the first material in the solidified state, simultaneously through an extrusion nozzle so as to produce a tubular wall including a plurality of circumferentially disposed, axially extending, reinforcements of the second plastics material having the first plastics material therebetween and whereby the first and second plastics materials are fused together.

It is to be understood that references herein and in the claims to first and second materials includes different grades of the same plastics material.

One form of reinforced flexible plastics tube according to the invention comprises an extruded wall of a first plastics material having a plurality of circumferentially disposed, axially extending, reinforcing elements of a second plastics material, fused thereto, said second material being more rigid and/or having a higher mechanical strength than the first material.

The reinforcing elements may be circumferentially spaced and may have a radially inwardly tapering cross-section, e.g., triangular. Or the reinforcing elements may overlap.

The invention also provides a method of making a reinforced flexible plastics tube as described above, comprising the steps of extruding a tubular wall of a first plastics material and a plurality of circumferentially disposed reinforcing elements of a second plastics material, said second material, in the solidified state, being more rigid and/or having a higher mechanical strength than said first plastics material in the solidified state, simultaneously through an extrusion nozzle, whereby the plastics material constituting the reinforcing elements is fused with the plastics material of the tubular wall.

Another form of reinforced flexible plastics tube according to the invention has an extruded wall comprising a plurality of circumferentially spaced, axially extending, portions of a first plastics material, and between each pair of adjacent portions and fused thereto, one of a plurality of circumferentially spaced, axially extending, portions of a second plastics material, said second plastics material being more rigid and/or having a higher mechanical strength than the first material.

The invention further provides a method of making such a tube comprising the steps of extruding a plurality of circumferentially disposed portions of a first plastics material and a plurality of circumferentially disposed portions of a second plastics material, which, in the solidified state, is more rigid and/or has a higher mechanical strength than the first plastics material in the solidified state, simultaneously through an extrusion nozzle with each portion disposed between portions of a different plastics material, whereby adjacent portions are fused together.

The invention also consists in apparatus for carrying out the above methods.

Figure 7:
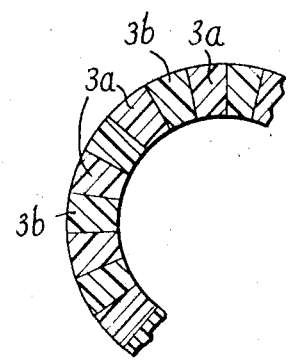
Figure 9:
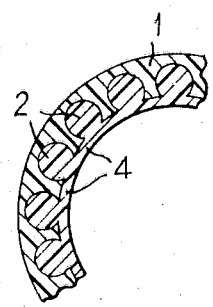
Figure 8:
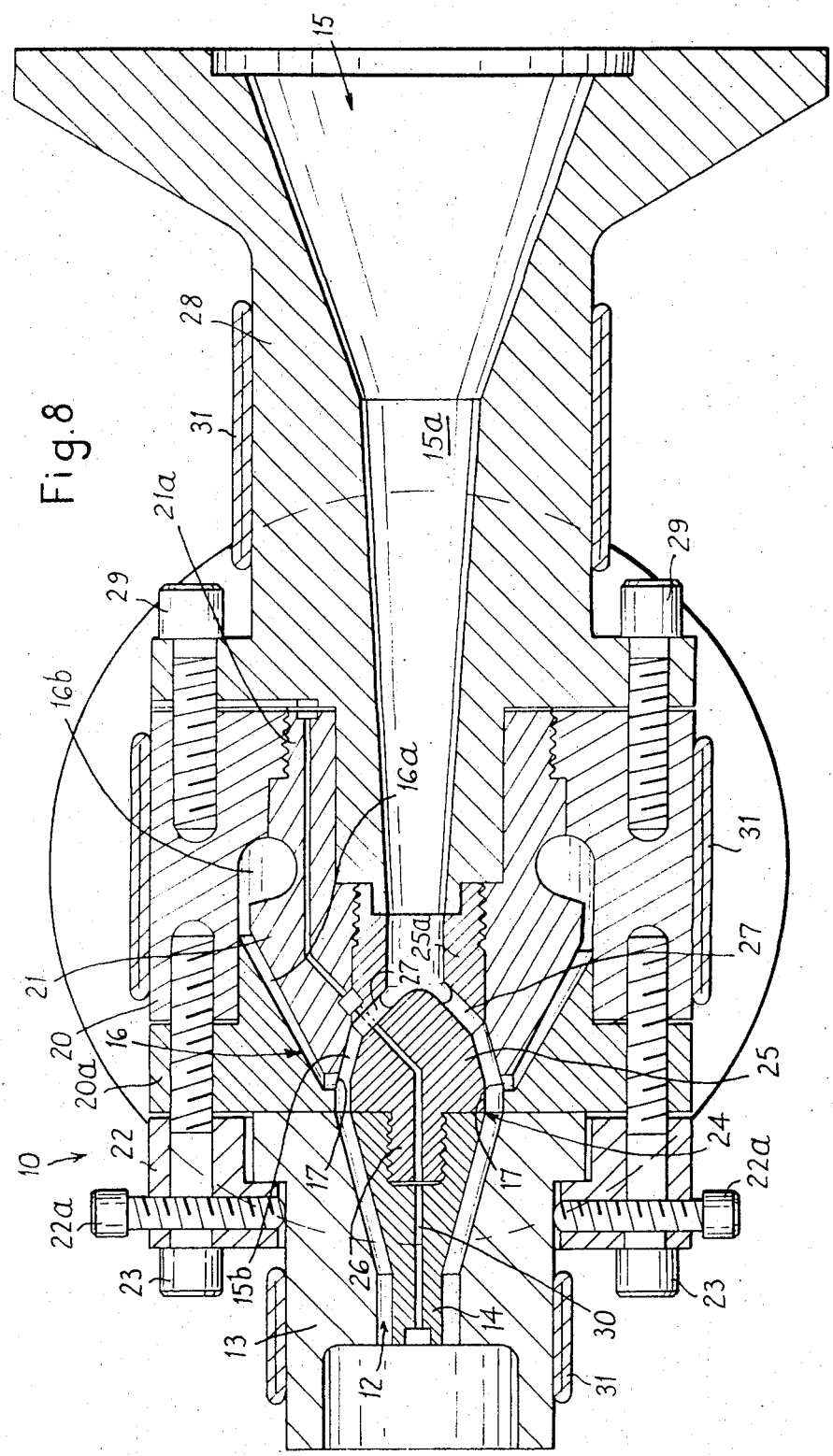

In order that the invention may be more readily understood, reference will now be made to the accompanying drawings, in which:

FIGS. 1 to 7 are fragmentary sectional views of various embodiments of tube according to the invention, FIG. 8 is a section through one embodiment of extrusion apparatus according to the invention, and FIG. 9 is a fragmentary sectional view of a further embodiment of tube according to the invention.

Referring to the drawings, FIGS. 1 to 6 show several embodiments of reinforced flexible plastics tube according to the invention, each comprising an extruded wall 1 of a first plastics material, such as a soft grade of polyvinylchloride, and a plurality of circumferentially disposed, axially extending, reinforcing elements 2 of a second plastics material partially or completely embedded in the tube wall 1. The second plastics material, for example a rigid grade of polyvinylchloride, is more rigid and has a higher mechanical strength than the surrounding wall of the first plastics material. By way of example, the first or wall material may have a softness of 45 (measured according to British Standard Specification No. 2782, Part 3, 1957) and the second or reinforcing material a softness of 15, measured according to the same specification. Furthermore, the two plastics materials are compatible and are fused together.

Figure 2:
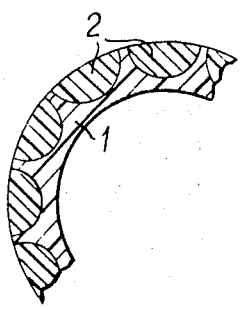

In the embodiments shown in FIGS. 1 and 2, the reinforcing elements are disposed at equally spaced intervals around the wall of the tube. In both these embodiments, the elements 2 are embedded in the wall 1 with their outwardly facing surfaces exposed at and forming part of the external surface of the tube wall 1, and the elements have a radially inwardly tapering cross-section. In FIG. 1, the elements are triangular in cross-section whereby a minimum area of the softer plastics material is exposed at the external surface of the tube wall. In FIG. 2, the elements have a substantially semi-circular cross-section.

Figure 3:
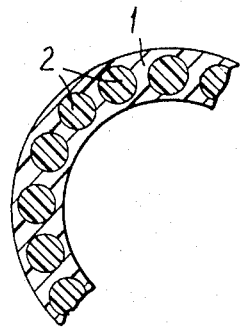

The tube shown in FIG. 3 has a plurality of equally spaced elements 2 of circular cross-section, which are completely embedded in the wall 1 thereof, that is to say the reinforcing elements are surrounded by the wall material.

The reinforcing elements 2 of the tubes described above suitably have a maximum radial dimension of 65–90 percent of the thickness of the wall 1 and preferably 80 percent of the wall thickness.

The reinforcing elements 2 may take various forms and dispositions other than those illustrated in FIGS. 1 to 3. For example, they may be circumferentially elongate or strip-like in cross-section as shown in FIGS. 4 to 6.

Figure 4:
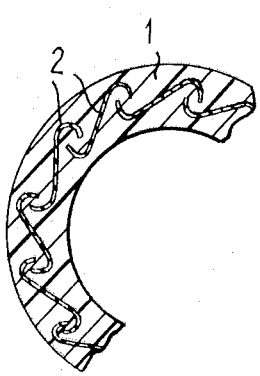
Figure 5:
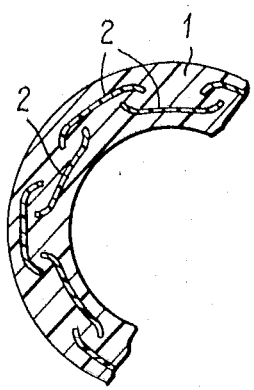
Figure 6:
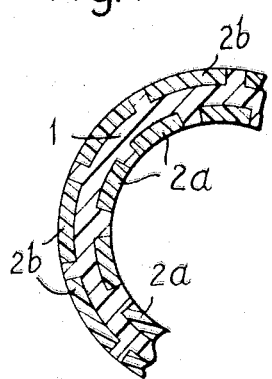

FIGS 4 to 6 also illustrate a further advantageous feature of the invention, according to which the reinforcing elements 2 take the form of spaced strips which overlap whereby there is no direct path between the inner and outer surfaces of the tube through the softer wall material. In FIG. 4, the strips are generally S-shaped in cross-section whilst in FIG. 5 the strips have a shallow channel-shaped cross-section, adjacent strips being oppositely arranged.

In FIG. 6, the plural strips are each embedded in the wall of the tube with a face thereof exposed at one of the inner and outer surfaces of the tube walls. As shown, a first series of strips 2a is disposed around the tube wall with the inwardly facing surfaces of the strips exposed at and forming part of the internal surface of the tube wall whilst a second series of strips 2b is disposed around the tube wall with the outwardly facing surfaces of these strips exposed at and forming part of the external surface of the tube wall. It will be seen that each strip in a series extends across the gap between a pair of adjacent strips of the other series.

Referring now to FIG. 7, there is shown another embodiment of tube according to the invention having an extruded wall comprising a plurality of circumferentially spaced segmental portions 3a of a first plastics material, e.g., a soft grade of polyvinylchloride, and between each pair of adjacent portions 3a and fused thereto, one of a plurality of circumferentially spaced portions 3b of a second plastics material compatible with the first plastics material and being more rigid and/or having a higher mechanical strength than the first material. The second material may, for example, be a rigid grade of polyvinylchloride. The tube wall 1 thus comprises alternate segments of the two plastics materials which are fused together.

An embodiment of apparatus for making a tube according to the invention is shown in FIG. 8. The apparatus comprises a die head 10 having an annular extrusion nozzle 12 defined by outer and inner die parts 13, 14. To the rear of the nozzle 12 are connected two inlet passageways 15, 16 through which plastics material is fed to the nozzle 12. Plastics material is fed through the passageway 15 from a continuous extruded (not shown), for example a screw extruder. The passageway 15 comprises a tubular portion 15a connecting with a diverging portion 15b of annular cross-section leading to the rear of the nozzle 12. Plastics material is fed through the passageway 16 from a second continuous extruder (also not shown), such as a screw extruder. The passageway 16 includes a frustoconical portion 16a of annular cross-section surrounding the passageway 15 and converging towards the rear of the die nozzle 12, this portion leading from an annular chamber 16b to which the plastics material is supplied through a tangential opening (not visible). The passageway communicates with the nozzle 12 through a plurality of circumferentially spaced apertures 17 surrounding the discharge end of the passageway 15, that is its end which communicates with the rear of the nozzle 12.

The die head 10 comprises a casing in two parts 20, 20a in which are mounted the die parts 13, 14 and an annular member 21 forming with the casing the chamber 18 and passageway 16. The inner die part 14 is mounted on the member 21 as described below. The outer die part 13 is mounted within a ring 22 secured to the front end of the casing by bolts 23 (which also secure the casing parts 20, 20a together) and may be adjusted to be concentric with the inner die part by means of adjustment screws 22a extending through the ring 22. The annular member 21 is provided with a screw threaded end 21a which is screwed into the rear end of the casing behind the chamber 18.

The passageway 16 is defined between the member 21 and the casing parts 20, 20a and the apertures or parts 17 are formed by castellations on the front end of the member 21. Within the member 21 is arranged a torpedo 24 composed of two parts, viz. the inner die part or die pin 14 and a die pin adaptor 25 to which the die pin 14 is secured by means of a threaded spigot 26. The adaptor 25 has a rearward extension 25a which is screw-threaded and is screwed into the member 21. The adaptor is supported from its extension 25a by a spider or the like between the webs or spokes of which are formed ports 27 interconnecting the passageway portions 15a and 15b. The passageway portion 15b is defined between the adaptor 25 and the surrounding member 21. A block 28 in which is formed the passageway portion 15a is secured to the rear of casing part 20 by bolts 29.

A vent passage 30 extends from the outlet end of the die pin 14 through the member 21 and the casing to atmosphere. Electrical or other heaters 31 surround the apparatus and ensure that the plastics materials being extruded remain in a thermoplastic condition.

In operation a first thermo-plastics material, such as a soft grade of polyvinylchloride, is supplied to the die nozzle 12 via the inlet passageway 15 and a second thermo-plastics material, which is compatible with the first thermo-plastics material, is supplied to the nozzle via the inlet passageway 16, the second material, for example a rigid grade of polyvinylchloride, in the solidified state, being more rigid and having a higher mechanical strength than the first plastics material, which, in the solidified state, is more plastic and softer than is the second material. The extruded supplying the first plastics material operates continuously so as to extrude a tubular wall of the first material through the nozzle 12. The second extruder also operates continuously to extrude elements (filaments) of the second material. These filaments are advanced through the nozzle 12 with the first plastics material as this is fed through the nozzle by the extruder supplying it. The filaments of the second material are thereby at least partially embedded in the tubular wall of the first material, to form the reinforcing elements 2.

The tube is cooled upon leaving the extrusion nozzle 12 and is pulled from the die by suitable traction means (not shown), for example a caterpillar haul-off device. If desired, the tube may be passed through a sizing device.

In the apparatus shown, the apertures 17 have a rectangular cross-section and a tube like that shown in FIG. 1 will be produced. However, it will be appreciated that tubes having reinforcement elements 2 of many different shapes, including those of FIGS. 2 and 3, may be produced by choosing suitable cross-sections for the apertures 17. In order to produce tubes as shown in FIGS. 4 and 5, the second plastic material, which forms the strip-like reinforcing elements 2, is fed into the die nozzle between two annular streams of the first plastics material. And, in order to produce a tube as shown in FIG. 6, the second plastics material is discharged into the die nozzle via a series of apertures in the outer wall of the passageway portion 15b and a series of apertures in the inner wall of the passageway portion 15b. By modifying the apparatus shown so that the passageway 15 communicates with the nozzle 12 via a plurality of circumferentially disposed apertures, a tube like that shown in FIG. 7 may be produced.

During passage through the nozzle 12 the materials are subjected to sufficient pressure that, since the two plastics materials are compatible, the reinforcement formed by the second material is fused to the tube wall formed by the first material so as to become an integral part of the tube wall. The bond so formed between the two plastic materials is sufficiently strong that when forces are applied tending to separate the two materials, tearing or splitting of the tube is at least as likely to occur through one of the materials as through the bond therebetween.

Plastics tubes reinforced according to this invention are found to have much improved resistance to both elongation and bursting upon the application of internal pressures, particularly at ambient temperatures, compared with tubes which are not so reinforced. Comparative tests between a tube reinforced as shown in FIG. 1 (tube A) and a tube not so reinforced (tube B), both tubes having an inside diameter of ⅜ inches and an outside diameter of ⅝ inches and the wall material of both tubes being of polyvinylchloride of a softness of 45 (according to British Standard Specification No. 2782, Part 3, 1957) and the reinforcing elements of the tube A being of polyvinylchloride of a softness of 15 (measured according to the same specification), gave the results shown in the table below.

TABLE

| Tube | Temperature 0°C. | Burst Pressure (Pounds/Square Inch) | Elongation at Burst Pressure |
|---|---|---|---|
| A | 25 | 550 | Not appreciable |
| B | 25 | 350 | 20% |

Not only was the surprising effect obtained that the tube A has much improved resistance to both elongation and bursting at ambient temperatures in spite of the uninterrupted paths through the softer wall material between adjacent reinforcing elements, but it was also found that when bursting did occur, the tube tore or split through the reinforcing elements and not through the softer wall material.

Whilst particular embodiments have been described, it will be understood that various modifications may be made without departing from the scope of the invention as defined in the appended claims. For example, although in the embodiment of apparatus shown, the inlet passageway 16 for the reinforcement material converges towards the extrusion nozzle 12 from a position radially outwardly of the inlet passageway 15 for the wall material, it will be appreciated that the positions of the two passageways may be reversed so that the reinforcing elements are adjacent the inside of the tube, in the case of FIGS. 1 and 2.

Whilst polyvinylchloride is specifically referred to above it will be appreciated that other plastics materials both thermo-plastic and elastomeric, may be used for the tubular wall and reinforcement, provided that the materials used for the wall reinforcement are compatible. Thus the tube wall may be extruded of elastomeric material whilst the reinforcement is extruded of a thermoplastic material, e.g., polyvinylchloride. By way of example, in one embodiment the wall material is extrudable nitrile rubber and the reinforcement is polyvinylchlorde. In another embodiment, the wall material is extrudable polyurethane elastomer and the reinforcement is nylon. When producing a tube using an elastomeric material for the wall of the tube, the tube is cured, e.g., in an autoclave or by passing it through a salt bath at the required temperature, suitably 80°C., as it leaves the extrusion nozzle.

In a modification, the discharge end of the passageway 15 may be constructed so as to form on the inside of the tube of the first material (or on the outside where the positions of the passageways 15 and 16 are reversed as described above), a tubular reinforcing member comprising circumferentially spaced reinforcing elements of the second material embedded in the wall of the first material and interconnected by thinner portions or membranes of the second material. An embodiment of such a tube is shown in FIG. 9 which comprises a tubular wall 1 of the first plastics material having fused to the inside surface thereof a tubular reinforcing member of the second plastics material comprising circumferentially spaced elements 2 interconnected by thinner membranes 4. If desired, a tubular reinforcing member such as illustrated in FIG. 9 may be completely embedded in the wall of the tube by extruding a second tube of the first plastics material on the inside or outside of the tubular reinforcing member, as the case may be, this second tube being fused to the reinforcing member. This may be effected simultaneously with the extrusion of the tube wall and the reinforcing member by providing a third inlet passageway communicating with the extrusion nozzle 12.

In another modification, a tube according to the invention has a tubular lining, e.g., of an abrasion resistant material such as polyurethane, on the inside and/or outside surface thereof.

If necessary or desired, a tube according to the invention may be strengthened against collapsing by the provision of a helically wound reinforcement. The reinforcement may, for example, comprise a helically wound wire or tape around the tube.

The reinforcing elements, instead of being partially or completely embedded in the wall of the tube (by which is meant that the reinforcing elements extend at least part way into the wall material) may extend along and be fused to one or both of the outer and inner surfaces of the tube wall.

One or both of the plastics materials constituting a tube according to this invention may be of an electrically conducting nature thereby imparting antistatic properties to the tube.

I claim:

1. A reinforced flexible plastics tube having an extruded wall constituted by first and second compatible plastics materials which are extruded together to form the body of the tube, wherein the second material is less flexible and harder than the first plastics material and defines a plurality of circumferentially disposed, axially extending, reinforcements having the first plastics material therebetween and fused thereto.

2. A tube according to claim 1, wherein the reinforcing elements are embedded in the tube wall with a surface of each element exposed at a surface of the wall.

3. A tube according to claim 2, wherein the reinforcing elements are circumferentially spaced and have a radially tapering cross-section.

4. A tube according to claim 3, wherein the reinforcing elements have a radially inwardly tapering, triangular cross-section.

5. A tube according to claim 1, including a plurality of reinforcing elements of substantially circular cross-section completely embedded in the wall of the tube.

6. A tube according to claim 1, wherein the reinforcing elements are circumferentially elongate in cross-section and adjacent elements overlap.

7. A tube according to claim 6, wherein the reinforcing elements are generally S-shaped in cross-section.

8. A tube according to claim 6, wherein the reinforcing elements have a shallow channel-shaped cross-section, adjacent strips being oppositely arranged 9. A tube according to claim 6, comprising two series of circumferentially spaced, strip-like reinforcing elements embedded in the wall of the tube with the inwardly facing surfaces of the elements of one series exposed at and forming part of the internal surface of the tube wall and the outwardly facing surfaces of the elements of the other series exposed at and forming part of the external surface of the tube wall, each element in a series extending circumferentially across the gap between a pair of adjacent strips of the other series.

10. A tube according to claim 1, including a tubular reinforcing member comprising circumferentially spaced reinforcing elements of the second material embedded in the wall of the first material and interconnected by thinner portions of the second material.

11. A tube according to claim 1, wherein the first plastics material consists of a flexible grade of polyvinylchloride, and the second plastics material consists of a harder polyvinylchloride of a harder grade than said first plastics material.

* * * * *